(12) United States Patent
Nishi et al.

(10) Patent No.: US 9,134,757 B2
(45) Date of Patent: Sep. 15, 2015

(54) ELECTRONIC DEVICE HAVING PASSIVE COOLING

(71) Applicant: INTEL CORPORATION, Santa Clara, CA (US)

(72) Inventors: Yoshifumi Nishi, Ushiku (JP); Mark MacDonald, Beaverton, OR (US); Douglas Heymann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 13/630,947

(22) Filed: Sep. 28, 2012

(65) Prior Publication Data

US 2014/0092544 A1    Apr. 3, 2014

(51) Int. Cl.
*G06F 1/16* (2006.01)
*G06F 1/20* (2006.01)

(52) U.S. Cl.
CPC .............. *G06F 1/1616* (2013.01); *G06F 1/203* (2013.01)

(58) Field of Classification Search
CPC ............ G06F 1/20; G06F 1/203; G06F 1/206
USPC .................. 361/679.48, 679.54–679.56, 690, 361/694–695, 697, 704; 165/185
See application file for complete search history.

(56) References Cited

U.S. PATENT DOCUMENTS

| | | |
|---|---|---|
| 5,383,340 A | 1/1995 | Larson et al. |
| 5,582,929 A | 12/1996 | Dechovich |
| 5,588,483 A | 12/1996 | Ishida |
| 5,621,613 A * | 4/1997 | Haley et al. ............... 361/679.27 |
| 5,732,765 A * | 3/1998 | Drolen et al. .................... 165/41 |
| 5,757,615 A * | 5/1998 | Donahoe et al. ......... 361/679.47 |
| 5,764,474 A | 6/1998 | Youens |
| 5,781,409 A | 7/1998 | Mercredy, III |
| 5,832,987 A | 11/1998 | Lowry et al. |
| 5,880,929 A * | 3/1999 | Bhatia ....................... 361/679.27 |
| 5,910,883 A * | 6/1999 | Cipolla et al. ............ 361/679.27 |
| 5,975,195 A | 11/1999 | Lowry et al. |
| 6,008,986 A | 12/1999 | Mok |
| 6,026,888 A | 2/2000 | Moore |
| 6,028,768 A * | 2/2000 | Cipolla ..................... 361/679.12 |
| 6,031,716 A * | 2/2000 | Cipolla et al. ............ 361/679.27 |
| 6,069,791 A | 5/2000 | Goto et al. |
| 6,078,499 A | 6/2000 | Mok |
| 6,118,655 A * | 9/2000 | Mecredy et al. ......... 361/679.47 |

(Continued)

FOREIGN PATENT DOCUMENTS

JP     09293985 A     11/1992
JP     2000-148304    5/2000

(Continued)

OTHER PUBLICATIONS

Written Opinion and International Search Report for Application PCT/US2011/067514 dated Sep. 25, 2012.

(Continued)

*Primary Examiner* — David M Sinclair
*Assistant Examiner* — Robert Brown
(74) *Attorney, Agent, or Firm* — KED & Associates LLP

(57) ABSTRACT

An electronic device is provided that includes a base having a first side and a second side, and a lid having a first side and a second side. The electronic device may also include a heat exchanger provided at the base. The heat exchanger may have a first surface exposed to outside the base.

19 Claims, 11 Drawing Sheets

(56) References Cited

U.S. PATENT DOCUMENTS

| | | | |
|---|---|---|---|
| 6,122,166 | A | 9/2000 | Mochizuki et al. |
| 6,125,035 | A * | 9/2000 | Hood et al. ............... 361/679.47 |
| 6,134,106 | A | 10/2000 | Tao et al. |
| 6,148,906 | A * | 11/2000 | Li et al. ................. 165/104.33 |
| 6,151,207 | A * | 11/2000 | Kim .......................... 361/679.26 |
| 6,167,949 | B1 * | 1/2001 | Langley et al. ........... 165/104.33 |
| 6,185,102 | B1 * | 2/2001 | Shou et al. .................... 361/704 |
| 6,212,069 | B1 * | 4/2001 | Janik et al. ................ 361/679.47 |
| 6,250,378 | B1 * | 6/2001 | Kobayashi ................. 165/104.33 |
| 6,253,836 | B1 * | 7/2001 | Mitchell ......................... 165/86 |
| 6,255,622 | B1 * | 7/2001 | May et al. ..................... 219/209 |
| 6,288,896 | B1 * | 9/2001 | Hsu ........................... 361/679.54 |
| 6,341,062 | B1 * | 1/2002 | Patel .......................... 361/679.54 |
| 6,418,017 | B1 * | 7/2002 | Patel et al. ..................... 361/700 |
| 6,449,149 | B1 | 9/2002 | Ohashi et al. |
| 6,453,378 | B1 * | 9/2002 | Olson et al. .................... 710/304 |
| 6,459,573 | B1 | 10/2002 | DiStefano et al. |
| 6,493,222 | B2 * | 12/2002 | DiFonzo et al. ......... 361/679.48 |
| 6,515,857 | B2 * | 2/2003 | Ford et al. ................. 361/679.53 |
| 6,771,498 | B2 | 8/2004 | Wang et al. |
| 6,795,310 | B2 * | 9/2004 | Ghosh ...................... 361/679.53 |
| 6,839,231 | B2 | 1/2005 | Fleck et al. |
| 6,958,910 | B2 * | 10/2005 | Tanaka et al. ................ 361/699 |
| 7,068,508 | B2 * | 6/2006 | Patel et al. .................... 361/699 |
| 7,113,399 | B2 * | 9/2006 | Hisano et al. ................. 361/688 |
| 7,417,863 | B2 | 8/2008 | Park |
| 7,505,255 | B2 | 3/2009 | Wu |
| 7,532,467 | B2 * | 5/2009 | Launay et al. ........... 361/679.48 |
| 7,558,062 | B2 | 7/2009 | Wang et al. |
| 7,746,631 | B2 | 6/2010 | Ali |
| 7,791,876 | B2 | 9/2010 | Moore et al. |
| 7,793,027 | B2 * | 9/2010 | Mok et al. ..................... 710/304 |
| 7,894,184 | B2 | 2/2011 | Huang et al. |
| 8,069,907 | B2 | 12/2011 | Bryant et al. |
| 8,355,248 | B2 | 1/2013 | Nishi |
| 8,363,392 | B2 * | 1/2013 | Tanaka ...................... 361/679.02 |
| 8,542,486 | B2 | 9/2013 | Lin et al. |
| 8,760,864 | B2 * | 6/2014 | Chiang .................... 361/679.52 |
| 2002/0001176 | A1 * | 1/2002 | Shibasaki ...................... 361/687 |
| 2002/0012228 | A1 * | 1/2002 | Ozaki et al. .................... 361/687 |
| 2002/0018335 | A1 * | 2/2002 | Koizumi ......................... 361/687 |
| 2002/0075647 | A1 * | 6/2002 | DiFonzo et al. .............. 361/687 |
| 2003/0011983 | A1 * | 1/2003 | Chu et al. ...................... 361/687 |
| 2003/0123223 | A1 * | 7/2003 | Pokharna et al. ............. 361/687 |
| 2004/0042172 | A1 * | 3/2004 | Kusaka et al. ................. 361/687 |
| 2004/0130870 | A1 * | 7/2004 | Fleck et al. .................... 361/687 |
| 2005/0105273 | A1 * | 5/2005 | Tanaka et al. ................. 361/699 |
| 2005/0162832 | A1 * | 7/2005 | Muller et al. .................. 361/699 |
| 2006/0028795 | A1 * | 2/2006 | Furuya .......................... 361/687 |
| 2006/0082966 | A1 * | 4/2006 | Lev et al. ....................... 361/687 |
| 2006/0114653 | A1 | 6/2006 | Seto et al. |
| 2006/0171113 | A1 * | 8/2006 | Wu ................................ 361/687 |
| 2006/0243878 | A1 * | 11/2006 | Saad ........................ 248/346.01 |
| 2008/0074842 | A1 * | 3/2008 | Tracy et al. .................... 361/695 |
| 2008/0212278 | A1 * | 9/2008 | DeLuga et al. ................ 361/690 |
| 2009/0002941 | A1 * | 1/2009 | Mongia et al. ................ 361/690 |
| 2009/0213537 | A1 * | 8/2009 | Heesen .................... 361/679.47 |
| 2009/0268392 | A1 * | 10/2009 | Cheng et al. ............ 361/679.52 |
| 2010/0079940 | A1 * | 4/2010 | Mongia et al. ........... 361/679.49 |
| 2010/0079945 | A1 | 4/2010 | Wang |
| 2010/0097764 | A1 * | 4/2010 | Iikubo .......................... 361/697 |
| 2010/0134976 | A1 * | 6/2010 | Kuo ............................. 361/695 |
| 2010/0134977 | A1 | 6/2010 | Chang et al. |
| 2010/0165567 | A1 * | 7/2010 | Shih et al. ................. 361/679.48 |
| 2010/0214743 | A1 * | 8/2010 | Huang et al. ................. 361/692 |
| 2010/0220439 | A1 * | 9/2010 | Qin ........................... 361/679.47 |
| 2010/0238619 | A1 * | 9/2010 | Shirasaka ................ 361/679.08 |
| 2010/0296946 | A1 * | 11/2010 | Chen et al. ..................... 417/44.2 |
| 2011/0075352 | A1 | 3/2011 | Tye et al. |
| 2011/0134605 | A1 * | 6/2011 | Chou et al. ............... 361/679.48 |
| 2011/0149495 | A1 * | 6/2011 | Mongia et al. ........... 361/679.08 |
| 2011/0205699 | A1 * | 8/2011 | Iijima ....................... 361/679.08 |
| 2011/0235275 | A1 | 9/2011 | Su et al. |
| 2011/0242757 | A1 | 10/2011 | Tracy et al. |
| 2011/0279974 | A1 * | 11/2011 | Fujiwara ....................... 361/692 |
| 2011/0279977 | A1 * | 11/2011 | Tanaka .......................... 361/697 |
| 2011/0292592 | A1 * | 12/2011 | Senatori ................... 361/679.46 |
| 2011/0292605 | A1 | 12/2011 | Chen et al. |
| 2011/0310557 | A1 * | 12/2011 | Ooe ............................. 361/692 |
| 2012/0002368 | A1 | 1/2012 | Broili et al. |
| 2012/0113593 | A1 * | 5/2012 | Hsu et al. ..................... 361/696 |
| 2012/0127652 | A1 * | 5/2012 | Lin et al. .................... 361/679.46 |
| 2012/0127663 | A1 * | 5/2012 | Mochizuki et al. .......... 361/692 |
| 2012/0130545 | A1 * | 5/2012 | Haugh et al. ................. 700/276 |
| 2012/0236517 | A1 * | 9/2012 | Nakajima .................... 361/752 |
| 2012/0327581 | A1 | 12/2012 | Pais et al. |
| 2013/0003284 | A1 * | 1/2013 | Massaro et al. .......... 361/679.28 |
| 2013/0027873 | A1 * | 1/2013 | Chen et al. ............... 361/679.46 |
| 2013/0027877 | A1 * | 1/2013 | Yang et al. .................... 361/692 |
| 2013/0063889 | A1 * | 3/2013 | Yee et al. ................. 361/679.48 |
| 2013/0077241 | A1 * | 3/2013 | Senatori ....................... 361/694 |
| 2013/0175018 | A1 * | 7/2013 | Huang ......................... 165/185 |
| 2013/0225065 | A1 * | 8/2013 | Lee .............................. 454/343 |
| 2013/0286292 | A1 * | 10/2013 | Yamaguchi et al. .......... 348/725 |

FOREIGN PATENT DOCUMENTS

| | | |
|---|---|---|
| KR | 10-2002-0032737 | 5/2002 |
| TW | 200907654 A | 2/2009 |
| TW | 201144991 A | 12/2011 |
| WO | WO 2013/100946 | 7/2013 |
| WO | 2014/052185 A1 | 4/2014 |
| WO | 2014/052201 A1 | 4/2014 |

OTHER PUBLICATIONS

International Search Report and Written Opinion dated Sep. 25, 2012 for PCT/US2011/067514.
International Search Report and Written Opinion dated Jan. 7, 2014 for PCT/US2013/060963.
U.S. Appl. No. 13/630,894, filed Sep. 28, 2012, Nishi et al.
International Preliminary Report on Patentability and Written Opinion received for PCT Patent Application No. PCT/US2011/067514, mailed on Jul. 10, 2014, 6 pages.
International Search Report and Written Opinion received for PCT Patent Application No. PCT/US2013/060879, mailed on Dec. 26, 2013, 10 pages.
U.S. Office Action for U.S. Appl. No. 14/006,547 dated Dec. 23, 2014.
Taiwanese Office Action (with English translation) and Search Report for Application 102134553 dated May 27, 2015.
U.S. Appl. No. 14/006,547 dated Jun. 5, 2015.

* cited by examiner

ELECTRONIC DEVICE HAVING PASSIVE COOLING

BACKGROUND

1. Field

Embodiments may relate to a passively cooled electronic device, such as a laptop computer or a notebook computer.

2. Background

Notebook computers and/or laptop computers may generate heat when operating. A fan may be provided within the notebook computer and/or the laptop computer in order to dissipate the generated heat.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be described with respect to a computer, such as a laptop computer or a notebook computer. However, arrangements and embodiments may be applicable to other electronic devices, such as mobile communication terminals.

Figure 1:
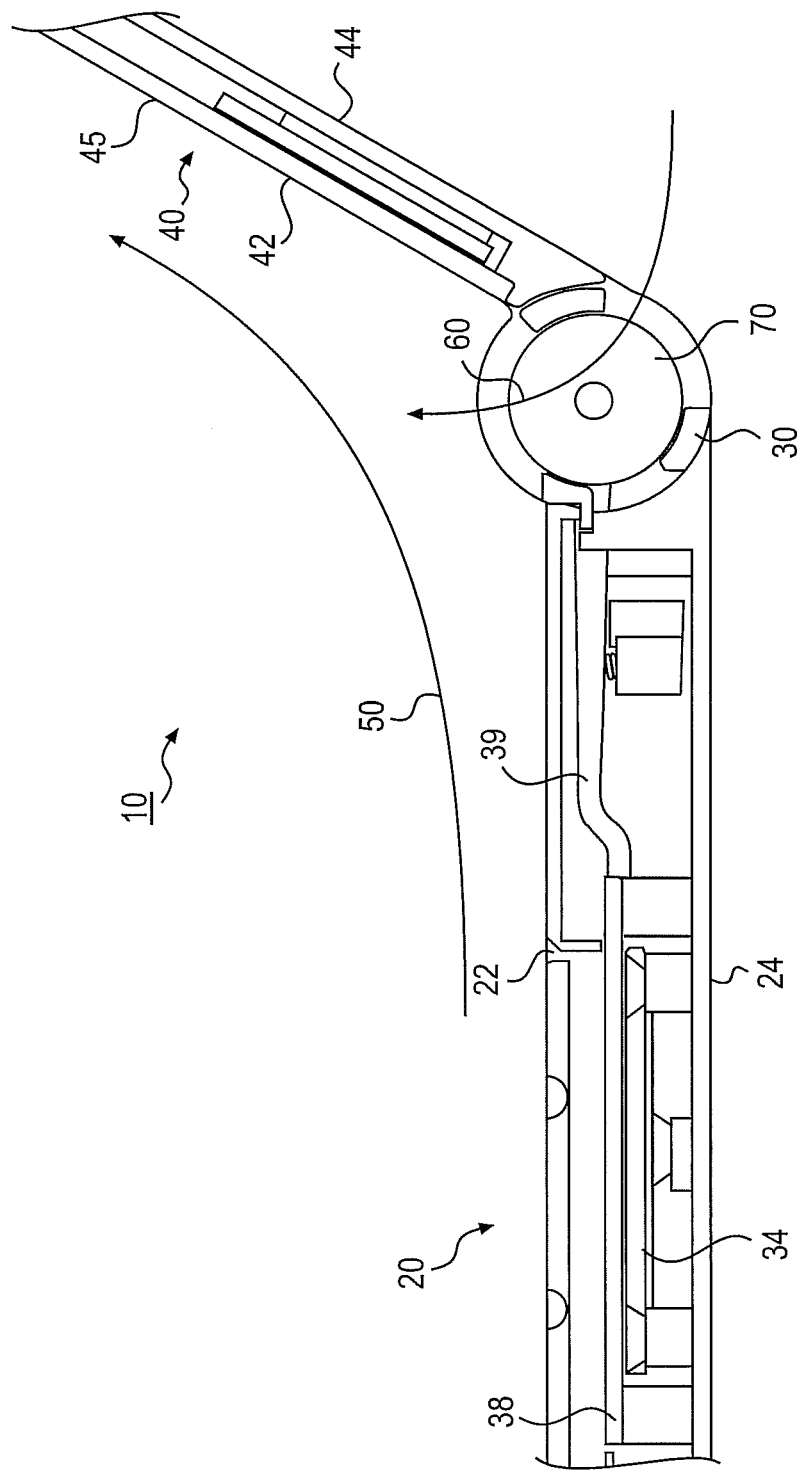
FIG. 1 is a side view of a passively cooled computer according to an example arrangement.

FIG. 1 shows a passively cooled computer according to an example arrangement. Other arrangements and configurations may also be provided.

FIG. 1 shows a passively cooled computer 10 such as a notebook computer or a laptop computer. The computer 10 may include a base 20 and a lid 40 that are coupled together by a hinge device 30. FIG. 1 shows the computer 10 in an opened state (or opened position) in which the lid 40 is separated away from the base 20. The computer 10 may also be provided in a closed state (or closed position) when the lid 40 is closed so as to be adjacent to the base 20.

The base 20 of the computer 10 may support various components such as a processor, a touch pad, a memory, a keyboard, a circuit board, a battery, etc. These components may generate heat during operation of the computer 10.

The lid 40 of the computer 10 may support a display 45 for a user to view during use of the computer 10. The lid 40 may support other electric components. The components of the lid 40 may further generate heat during operation of the computer 10.

When the computer 10 is in an opened state, the keyboard on the base 20 and the display 45 on the lid 40 may be exposed to a user located in front of the computer 10.

The base 20 may include a first side 22 (or top side) and a second side 24 (or bottom side). The lid 40 may include a first side 42 and a second side 44. When the computer 10 is in the opened state (such as shown in FIG. 1), the first side 42 of the lid 40 is separated away from the first side 22 of the base 20. In other words, the keyboard on the first side 22 of the base 20 is exposed to a user and the display 45 on the first side 42 of the lid 40 is exposed to a user. When the computer 10 is in the closed state, the first side 42 of the lid 40 is closed so as to be adjacent to the first side 22 of the base 20. In other words, the keyboard on the first side 22 of the base 20 is not exposed to a user and the display 45 on the first side 42 of the lid 40 is not exposed to a user.

During operation of the computer 10 while the computer 10 is in an opened state, heat generated by the components of the computer 10 may create a convection plume 50, such as a natural convection plume, over the first side 22 of the base 20 and the first side 42 of the lid 40, and to an area above the lid 40. The convection plume 50 is a flow of heat in a direction from the first side 22 toward the first side 42 and subsequently away from the first side 42 (of the lid 40). In FIG. 1, the convection plume 50 flows in a left to right direction and then upward. The convection plume 50 dissipates heat generated by the computer 10. The convection plume 50 may be created without the use of a fan, even though a fan may be provided in the base 20.

The hinge device 30 may allow the lid 40 to rotate (or move) about a rotational axis that is parallel to a width of the lid 40 (or a width of the base 20). The lid 40 may rotate about the rotational axis of the hinge device 30 between the closed state and the opened state.

In at least one arrangement, a passive heat exchange device 70 may be provided in an area of the hinge device 30 between the base 20 and the lid 40. The heat exchange device 70 may be adjacent to the hinge device 30 in an area between the base 20 and the lid 40, and the heat exchange device 70 may create an opening (or openings) in the area between the lid 40 and the base 20. The heat exchange device 70 may be considered passive since it does not directly include a fan.

The heat exchange device 70 may be provided in an area near or at a back end of the base 20. The hinge device 30 may include a first hinge device and a second hinge device spaced apart from the first hinge device. The heat exchange device 70 may be provided in an area between the first hinge device and the second hinge device.

The opening (or openings) created by the heat exchange device 70 may induce an air flow 60 from behind the computer 10 to in front of the computer 10, and into the convection plume 50. That is, the opening(s) of the heat exchange device 70 may allow air to pass from behind the computer 10 and into the convention plume 50. Stated differently, air behind the computer 10 may be sucked into the convection plume 50 via the opening(s) in the heat exchange device 70. This may further dissipate heat from the computer 10.

FIG. 1 also shows components within the base 20 according to an example arrangement. The shown components include a processor 34 on a circuit board, a thermal attacher 38 coupled to the processor 34 and a heat spreader 39 coupled to the thermal attacher 38. The heat spreader 39 may also be considered a heat pipe. The thermal attacher 38 and the heat spreader 39 may also be called a heat dissipating device to dissipate heat from the processor 34 to the heat exchange device 70.

The heat exchange device 70 may be physically connected to the heat spreader 39 (or to the heat dissipating device). Heat generated by the processor 34 (on the circuit board) or other components may be distributed by the thermal attacher 38 and the heat spreader 39 to the heat exchange device 70. The heat exchange device 70 may therefore receive energy or heat generated from the processor 34 and/or other components.

The heat exchange device 70 may include at least one heat pipe and a plurality of fins that extend perpendicularly from an axis of the at least one heat pipe. The at least one heat pipe may be coupled to the heat dissipating device to receive heat from components within the base 20.

The openings of the heat exchange device 70 may allow the induced air flow 60 to flow when the computer 10 is provided in the opened state, such as shown in FIG. 1. The induced air flow 60 that flows through the openings may help dissipate the heat or energy at the heat exchange device 70 to outside of the computer 10. The dissipated heat or energy may be provided to the convection plume 50. The convection plume 50 may dissipate the heat or energy away from (or above) the computer 10.

As shown by the induced air flow 60, air from behind the computer 10 may pass through the heat exchange device 70 and into the convection plume 50. The air may absorb heat provided at the heat exchange device 70, and may remove some of the heat from the heat exchange device 70.

When the opening angle of the lid 40 is large, the convention plume 50 may detach away from the lid 40 and the heat exchange device 70 may create its own convection plume (or natural convection plume) in order to dissipate heat.

The heat exchange device 70 and the hinge device 30 may be provided between the base 20 and the lid 40. The heat exchange device 70 may be provided adjacent to the hinge device 30 such that both the heat exchange device 70 and the hinge device 30 are provide in a same area between the base 20 and the lid 40 when the computer 10 is in the opened state. The heat exchange device 70 may be independent of the hinge device 30.

The hinge device 30 may allow the lid 40 to move relative to the base 20 between the closed state (of the computer 10) and the opened state (of the computer 10).

The heat exchange device 70 may take any of a number of specific shapes or types. For example, the heat exchange device 70 may include a number of openings and/or fins to allow the air flow 60 to flow from the rear of the computer 10 to a front of the computer 10. The fins may extend perpendicularly from a heat pipe. The opening(s) or fins may provide an air flow passage from the rear to the front of the lid 40 such that the air flow 60 joins the convection plume 50. The heat exchange device 70 may be unique in that air flows from a rear to a front and ultimately to the convection plume 50. The air from the rear of the computer 10 may be sucked into the convection plume 50 via the openings of the heat exchange device 70, and thereby dissipate the heat from the heat exchange device 70.

The heat exchange device 70 may be physically connected to the base 10, and more specifically may be connected to the heat spreader 39. The heat exchange device 70 may be a passive device since it does not specifically operate using a fan to dissipate heat. The flow of air by the convection plume 50 (or natural convection plume) may receive the induced air flow 60.

Figure 2:
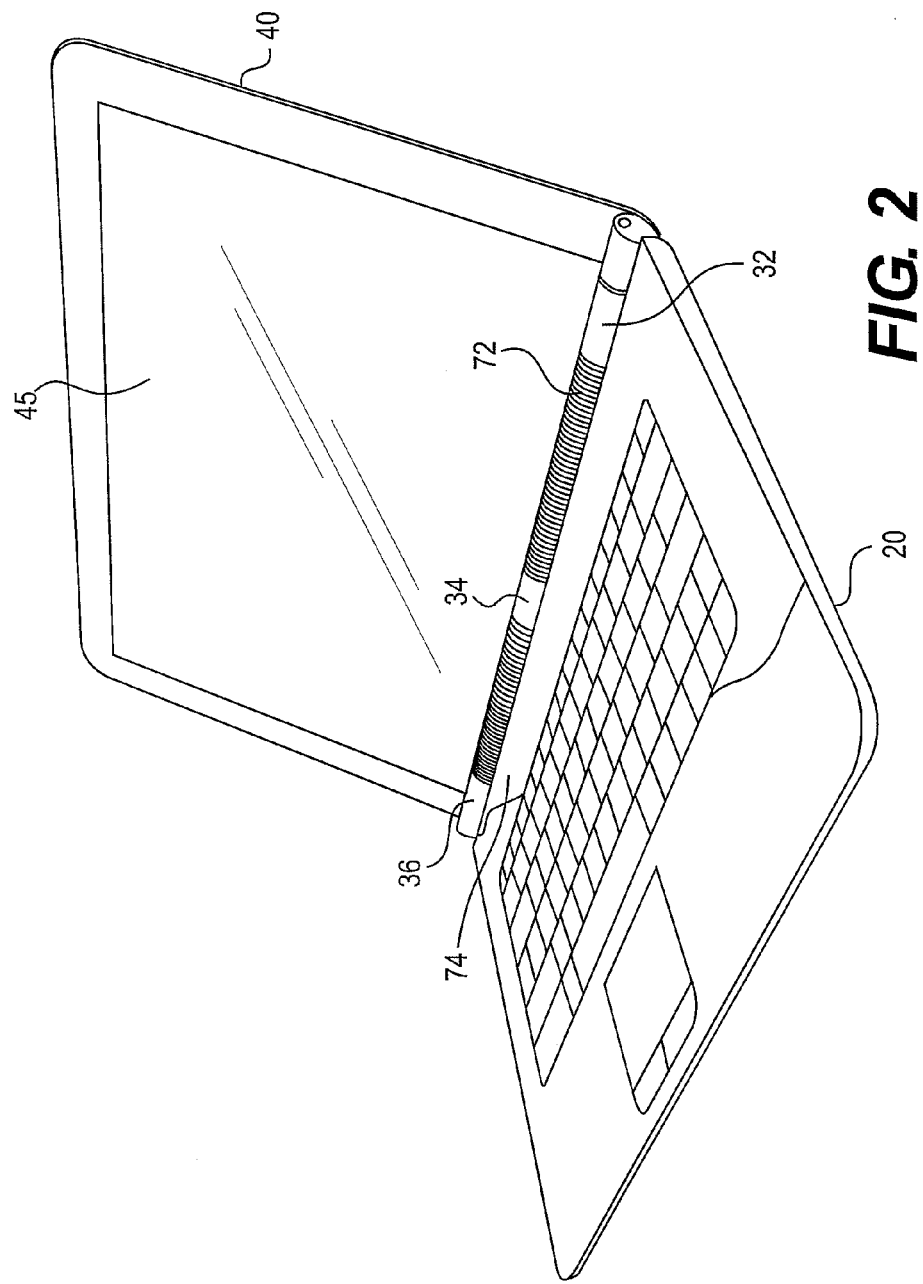
FIG. 2 shows a passively cooled computer according to an example arrangement.

FIG. 2 shows a passively cooled computer according to an example arrangement. Other arrangements and configurations may also be provided.

FIG. 2 shows the computer 10 in the opened state such that the lid 40 is opened when compared to the base 20. FIG. 2 shows the hinge device 30 as a first hinge component 32, a second hinge component 34 and a third hinge component 36. Each of the first, second and third components 32, 34, 36 of the hinge device 30 allow the lid 40 to move (or rotate) relative to the base 20.

FIG. 2 also shows the heat exchange device 70 as first openings 72 for a heat exchange component and second openings 74 for a heat exchange component. The heat exchange components may be fixedly attached to the base 20 such that the heat exchange components and the openings 72, 74 do not move (or rotate) when the lid 40 is opened. In other words, the first openings 72 and the second openings 74 are stationary when the lid 40 moves.

The heat exchange components may include a plurality of fins, such as extending from a heat pipe, for example. The fins may be made of a metallic material such as copper or aluminum, for example. The fins may include fins of copper or fins of aluminum, for example.

The openings 72 may be provided between a rear of the heat exchange 70 and a front of the heat exchange 70. The air flowing through the openings 72 may receive heat or energy from the fins, and dissipate the heat or energy to the convection plume 50 located in front of the display 45 on the lid 40.

The openings 72 may be provided between a rear of the heat exchange device 70 and a front of the heat exchange device 70. The air flowing through the openings 74 may receive heat or energy from the fins, and dissipate the heat or energy to the convection plume 50 located in front of the display on the lid 40.

Embodiments may provide a heat exchanger (or heat exchange device) at a base of a computer (or electronic device). The heat exchanger may include a heat exchange surface (or heat exchange surface) that may be exposed to outside of the computer. The heat exchange surface may be a flat surface at a top surface of the base, for example. The heat exchange surface may be a flat surface at a bottom surface of the base, for example. The heat exchanger and/or the heat exchange surface may be coupled to a heat dissipating device (or system spreader). The heat dissipating device may dissipate heat from electronic components within the base. The heat may dissipate from the base via the heat exchange surface.

The heat exchanger may have a bar-like shape that extends in a longitudinal direction between sides of the base. The heat exchanger may have a top surface exposed at a top surface of the base. The heat exchanger may have a bottom surface exposed at a bottom portion of the base.

The heat exchanger may also be made of a metallic material so as to capture and dissipate heat to outside the computer.

Figure 3:
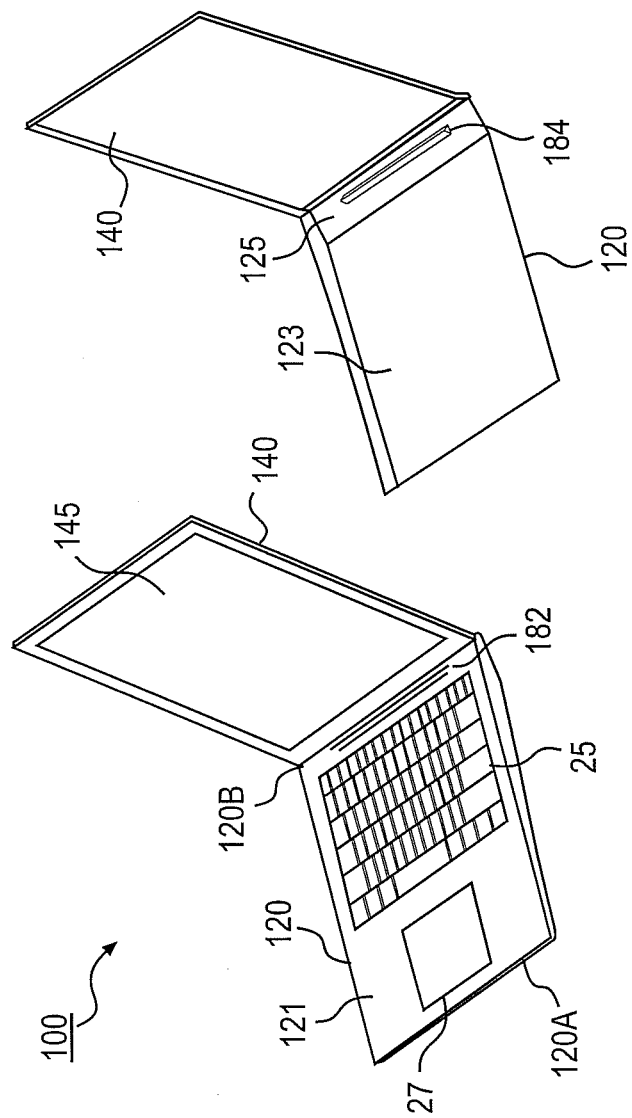
FIG. 3 shows a passively cooled computer according to an example embodiment.

FIG. 3 shows a passively cooled computer according to an example embodiment. Other embodiments and configurations may also be provided.

More specifically, FIG. 3 shows a computer 100 having a base 120 and a lid 140. The base 120 may include components from the base 20 (FIG. 1). The lid 140 may include components from the lid 40 (FIG. 1). A hinge device may allow movement of the lid 140 relative to the base 120.

FIG. 3 shows that the base 120 includes a keyboard 25 and a touch pad 27 on a top surface 121 of the base 120. The top surface 121 of the base 120 may extend from a front area 120A to a rear area 120B. The rear area 120B may be an area between the keyboard 25 and a rear edge (or rear side) of the base 120.

FIG. 3 also shows a heat exchange surface 182 exposed to outside the top surface 121 of the base 120. The heat exchange surface 182 may be provided at the rear area 120B of the base 120 near the lid 140 (when the lid 140 is provided in the opened state). The heat exchange surface 182 may be exposed through a venting slit on the top surface 121 of the base 120. The heat exchange surface 182 may be a flat surface, for example.

FIG. 3 also shows a backside of the computer 100. For example, a bottom portion of the base 120 may include a first bottom part 123 and a second bottom part 125. The first bottom part 123 may be provided to support the computer 100 on a support surface, such as a desk or a table. The second bottom part 125 may extend up from the first bottom part 121 so that the second bottom part 125 is raised from the support surface.

As shown in FIG. 3, a heat exchange surface 184 may be exposed at the second bottom part 125 of the base 120. The heat exchange surface 184 may be exposed to outside the computer 100 via a venting slit (or venting slits) on the second bottom part 125 of the base 120. The heat exchange surface 184 may be a flat surface, for example.

The heat exchange surface 182 at the top surface 121 of the base 120 may be coupled to the heat exchange surface 184 at the second bottom part 122 of the base 120. For example, a heat exchanger (or heat exchange device) may be provided between the heat exchange surface 182 and the heat exchange surface 184. The heat exchanger may be a single structure having a top side surface (i.e., the heat exchange surface 182) and a bottom side surface (i.e., the heat exchange surface 184). The single structure may be of a flat metallic material.

A heat dissipation device (or system spreader) may be provided within the base 120. The heat dissipation device may be coupled to the heat exchanger and/or either one or both of the heat exchange surface 182 and the heat exchange surface 184. The heat dissipation device may help dissipate heat from electronic components (such as a processor or circuit board) provided within the base 120.

In at least one embodiment, the heat exchange surface 182 may not be directly exposed to outside of the base.

Figure 4:
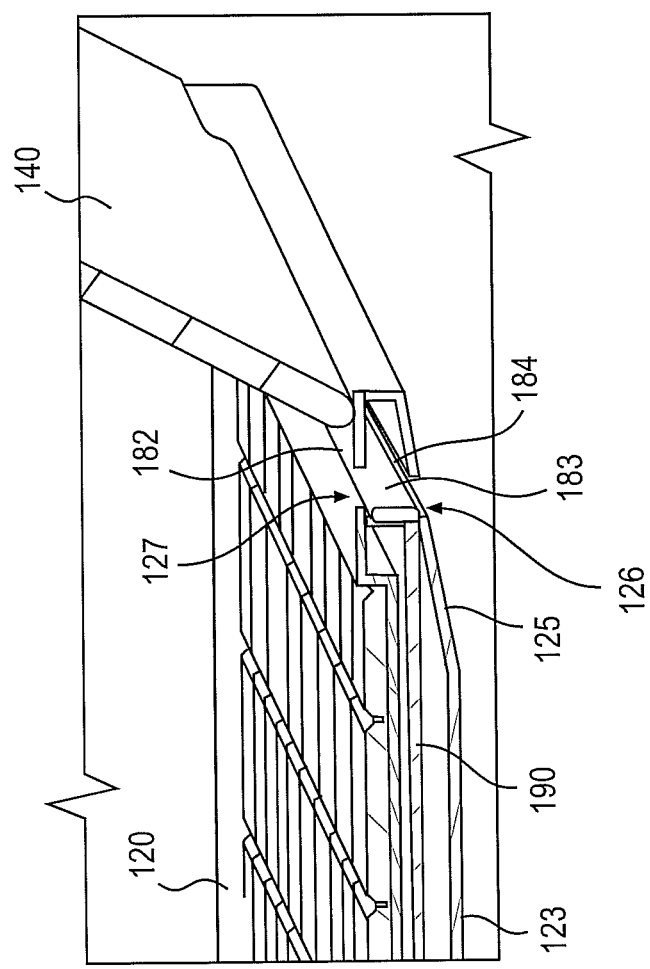
FIG. 4 is a cross-section view of a passively cooled computer according to an example embodiment.

FIG. 4 is a cross-sectional view of a passively cooled computer according to an example embodiment. Other embodiments and configurations may also be provided.

FIG. 4 shows a heat exchanger 183 provided at the base 120. The heat exchange surface 182 and the heat exchange surface 184 may be coupled to the heat exchanger 183 and can act as heat exchanging surfaces. The heat exchanger 183, the heat exchange surface 182 and the heat exchange surface 184 may be a single metallic bar. The heat exchanger 183 may be provided within (or at) the base 120. The heat exchanger 183 may provide a better heat dissipation while avoiding (or reducing) direct exposure to users.

FIG. 4 shows the first bottom part 123 and the second bottom part 125 at the bottom portion of the base 120. The first bottom part 123 may support the computer 100 on a support surface, such as a desk or a table. The second bottom part 125 may extend up from the first bottom part 123.

FIG. 4 also shows the base 120 may include a venting slit 127 and a venting slit 126. The venting slit 127 may be at the top surface 121 of the base 120. The venting slit 126 may be at the second bottom part 125 of the base 120.

The heat exchange surface 182 may be exposed through the venting slit 127 at the top surface 121 of the base 120. The venting slit 127 exposing the heat exchange surface 182 may be provided at the rear area 120B, which is an area near the lid 140 (when the lid 140 is provided in an opened state). Heat may dissipate from the computer 100 via the heat exchange surface 182.

The heat exchange surface 184 may be exposed through the venting slit 126 at the second bottom part 125 of the base 120. Heat may dissipate from the computer 100 via the heat exchange surface 184.

FIG. 4 also shows a heat exchanger 183 that includes the heat exchange surface 182 and the heat exchange surface 184. Accordingly, the heat exchange surface 182 may be coupled to the heat exchange surface 184 as the heat exchanger 183. The heat exchanger 183 may have a bar-like shape that extends in a longitudinal direction at a rear side (or back side) of the base 120. The heat exchanger 183 may extend in the longitudinal direction between a first side and a second side of the base 120.

FIG. 4 also shows a heat dissipation device 190 (or system spreader) provided within the base 120. The heat dissipation device 190 may be coupled to the heat exchanger 183. The heat dissipation device 190 may help dissipate heat from electronic components (such as a processor or circuit board) provided within the base 120. Heat may be provided from the heat dissipation device 190 and to the heat exchanger 183. Heat may be provided to the heat exchange surface 182 and/or the heat exchange surface 184. Heat may then be provided to outside of the computer 100 via the heat exchanger 183, the heat exchange surface 182, and/or the heat exchange surface 184.

Figure 5:
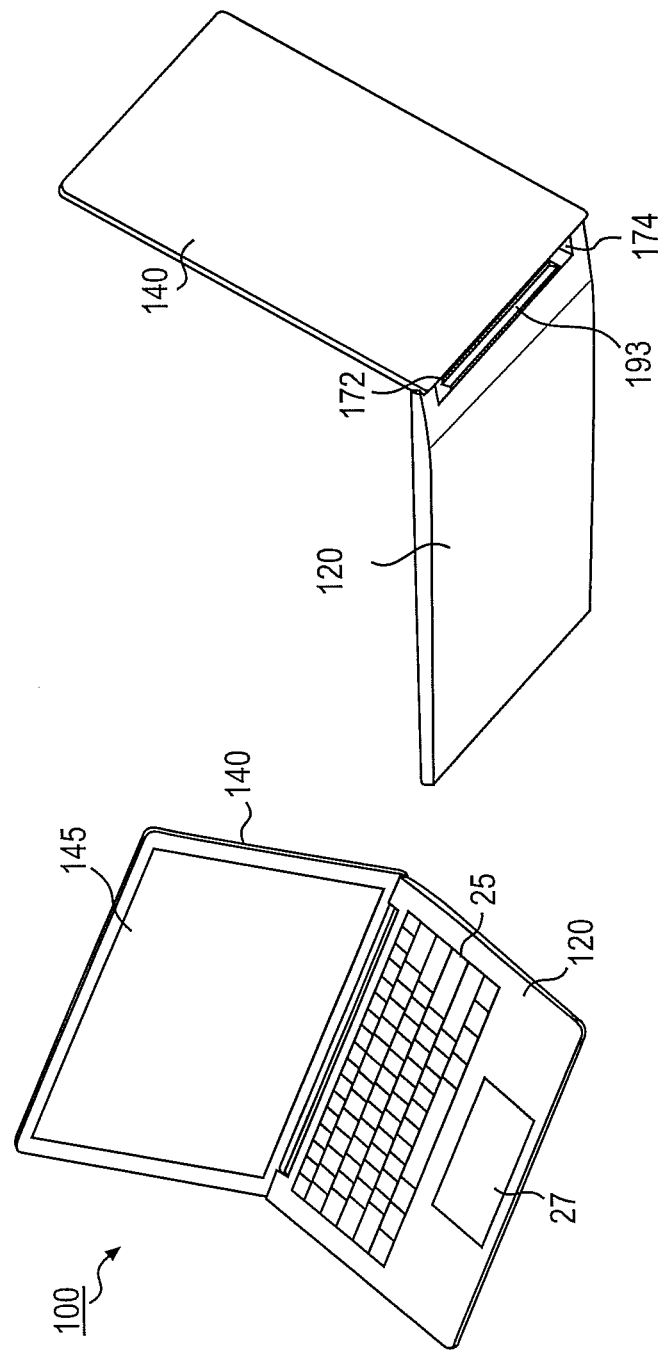
FIG. 5 shows a passively cooled computer according to an example embodiment.
Figure 6:
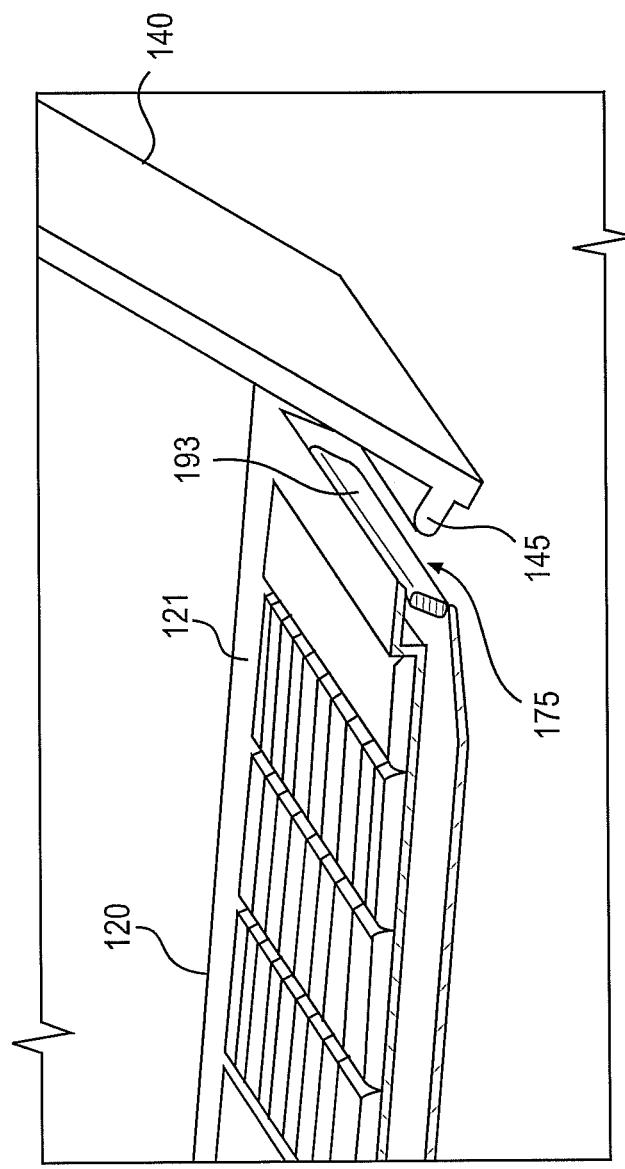
FIG. 6 is a cross-section view of a passively cooled computer of FIG. 5.

FIG. 5 shows a passively cooled computer according to an example embodiment. FIG. 6 is a cross-sectional view of the passively cooled computer of FIG. 5. Other embodiments and configurations may also be provided.

Embodiments may utilize a gap between hinge devices and a base of a computer.

FIG. 5 shows a first hinge device 172 and a second hinge device 174 coupled between the lid 140 and the base 120. A heat exchanger 193 may be provided in an area between the first hinge device 172 and the second hinge device 174.

FIG. 6 shows the heat exchanger 193 provided at a rear side (or back side) of the base 120. The rear side (or back side) of the base 120 may be sloped. A top surface of the heat exchanger 193 may not be exposed on the top surface 121 of the base 120. A bottom surface or other portions of the heat exchanger 193 may be exposed at the rear side (or back side) of the base 120.

The heat exchanger 193 may also be coupled to a heat dissipation device (or internal heat spreader), such as the heat dissipation device 190 shown in FIG. 4. The heat dissipation device may help dissipate heat from electronic components (such as a processor or circuit board) provided within the base 120. Heat may be provided from the heat dissipation device and to the heat exchanger 193. Heat may be provided to a heat exchange surface of the heat exchanger 193. Heat may then be provided to outside of the computer 100 via the heat exchanger 193, and/or the heat exchange surface(s).

The lid 140 may be coupled to the base 120 by the first hinge device 172 and the second hinge device 174. As shown in FIG. 6, the lid 140 may include a tab 145 that may be provided at one end of the lid 140. In the opened state, the tab 145 may be adjacent the heat exchanger 193 with a hinge gap 175 between the tab 145 and the heat exchanger 193. When provided in the closed state, the tab 145 may cover (or partially cover) the heat exchanger 193 for protection. This may help conceal the heat exchanger 193 from a user.

Figure 7:
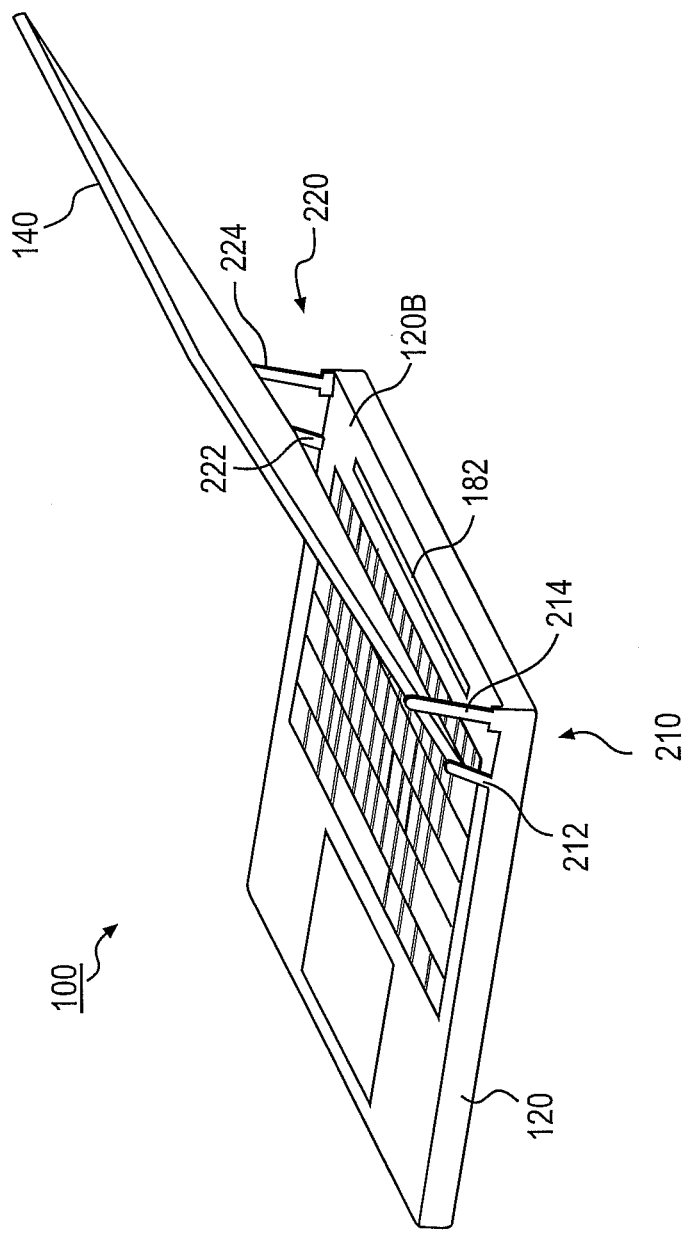
FIG. 7 shows a passively cooled computer according to an example embodiment.

FIG. 7 shows a passively cooled computer according to an example embodiment. FIGS. 8A-8D show opening positions of the passively cooled computer of FIG. 7. Other embodiments and configurations may also be provided.

Embodiments may provide a hinge device that may lift the lid (and display) when the lid is moved to the opened position so there is an extra gap between the lid and the base. Air from a rear side of the computer may be entrained through the gap. The rear area of the base (below the lid) may have a heat exchange surface (or heat dissipating surface). The hinge device may be a telescopic hinge device or a dual link hinge device.

More specifically, FIG. 7 shows that the computer 100 includes the base 120, the lid 140, a first hinge set 210 and a second hinge set 220. The first hinge set 210 and the second hinge set 220 may be called a dual link hinge device. The base 120 also includes the heat exchange surface 182 exposed through a venting slit at the rear area 120B (near the lid 140) of the base 120.

The first hinge set 210 may be provided on one side of the computer 100, and the second hinge set 220 may be provided on the other side of the computer 100.

The first hinge set 210 may include a first hinge leg 212 and a second hinge leg 214. The second hinge set 220 may include a first hinge leg 221 and a second hinge leg 224.

The first hinge leg 212 (of the first hinge set 210) may have a first end coupled to the base 120 and have a second end coupled to the lid 140. The second hinge leg 214 (of the first hinge set 210) may have a first end coupled to the base 120 and have a second end coupled to the lid 140.

The first hinge leg 222 (of the second hinge set 220) may have a first end coupled to the base 120 and have a second end coupled to the lid 140. The second hinge leg 224 (of the second hinge set 220) may have a first end coupled to the base 120 and have a second end coupled to the lid 140.

When the lid 140 is provided in the opened state, the heat exchange surface 182 may be exposed through a venting slit at the rear area 120B of the base 120. When the lid 140 is provided in a closed state, the heat exchange surface 182 may not be exposed since the venting slit may be covered by the lid 140. According, a user may not be able to easily touch the heat exchange surface 182 when the computer 100 is provided in the closed state.

Figure 8A:
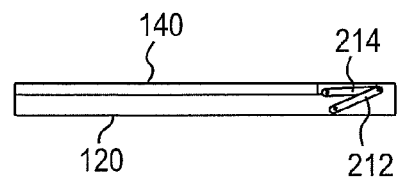
FIGS. 8A-8D shows opening positions of the passively cooled computer of FIG. 7.
Figure 8B:
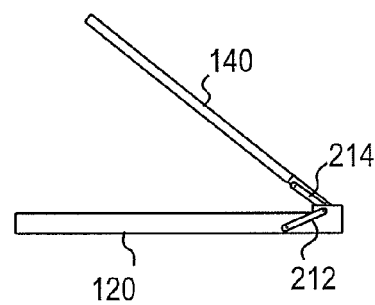
Figure 8C:
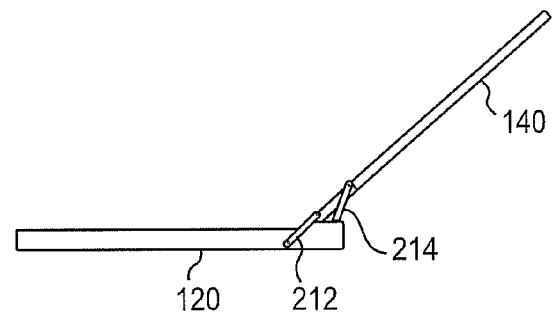
Figure 8D:
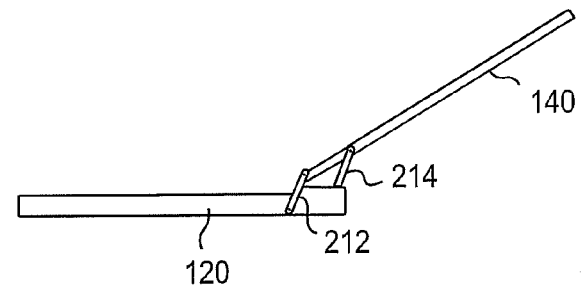

FIGS. 8A-8D show the opening of the computer 100 using the first hinge set 210 (and the second hinge set 220). FIG. 8A shows the computer in the closed state (or the closed position). In the FIG. 8A position, the heat exchange surface 182 may not be exposed to a user. FIGS. 8B-8D show movement of the first hinge leg 212 and the second hinge leg 214 until the lid is provided in the opened state. In the FIG. 8D position, the heat exchange surface 182 may be exposed through the venting slit so as to dissipate heat to outside of the computer 100.

Figure 9:
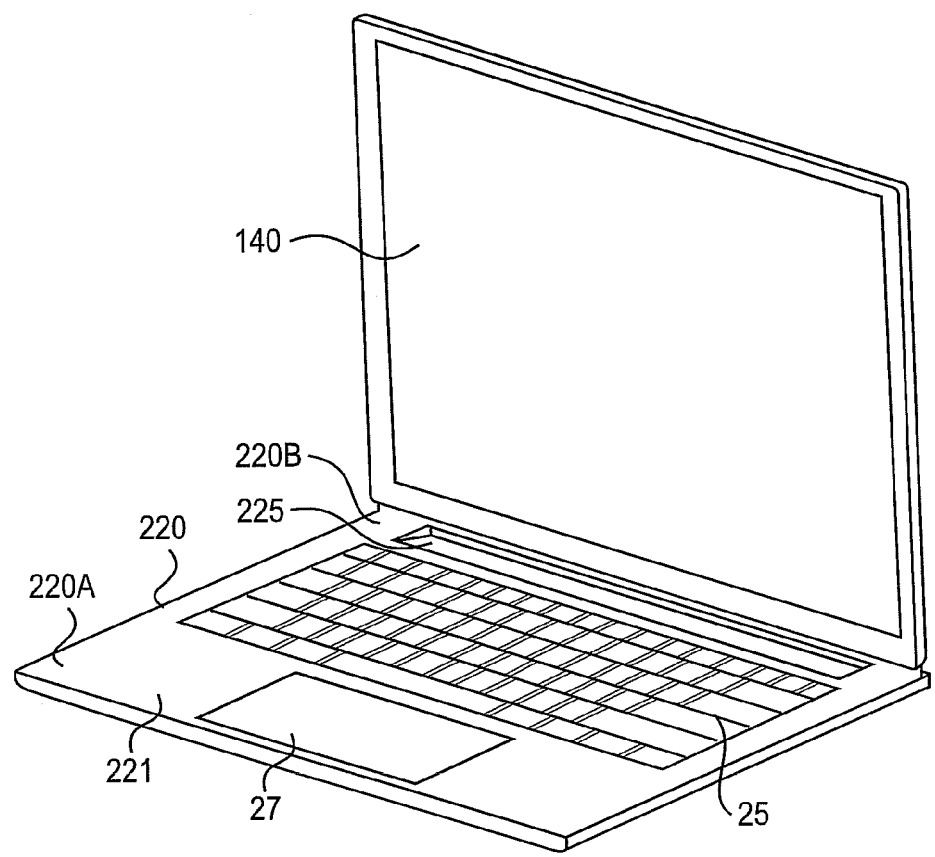
FIG. 9 shows a passively cooled computer according to an example embodiment.

FIG. 9 shows a passively cooled computer according to an example embodiment. Other embodiments and configurations may also be provided.

More specifically, FIG. 9 shows a base 220 and the lid 140. The base 220 may include components from the base 20 (FIG. 1) and/or the base 120 discussed above. FIG. 9 shows that the base 220 includes the keyboard 25 and the touch pad 27 at a top surface 221 of the base 220. The top surface 221 may extend from a front area 220A to a rear area 220B. The rear area 220B may be an area between the keyboard 25 and a rear side (or back side) of the base 220.

The base 220 may include a tapered section 225 at the top surface 221 of the base 220. The tapered section 225 may be provided in the rear area 220B of the base 220. The tapered section 225 may extend from an area on one side of the keyboard 25 and extend downward to a rear side (or back side) of the base 220. The tapered section 225 of the base 220 may slope downward at an angle toward the rear side (or back side) of the base 220. The tapered section 225 may also be called a rear porch of the base 220. When the lid 140 is provided in the opened state, the tapered section 225 may allow an air flow between a rear of the computer 100 and an area in front of the lid 140 (or over the base 220). When the lid 140 is provided in the closed state, the tapered section 125 may be seen from the back side of the base 220.

A heat exchange surface may be provided at the tapered section 225 of the base 120. The heat exchange surface may dissipate heat into a gap between the base 220 and the lid 140.

Figure 10:
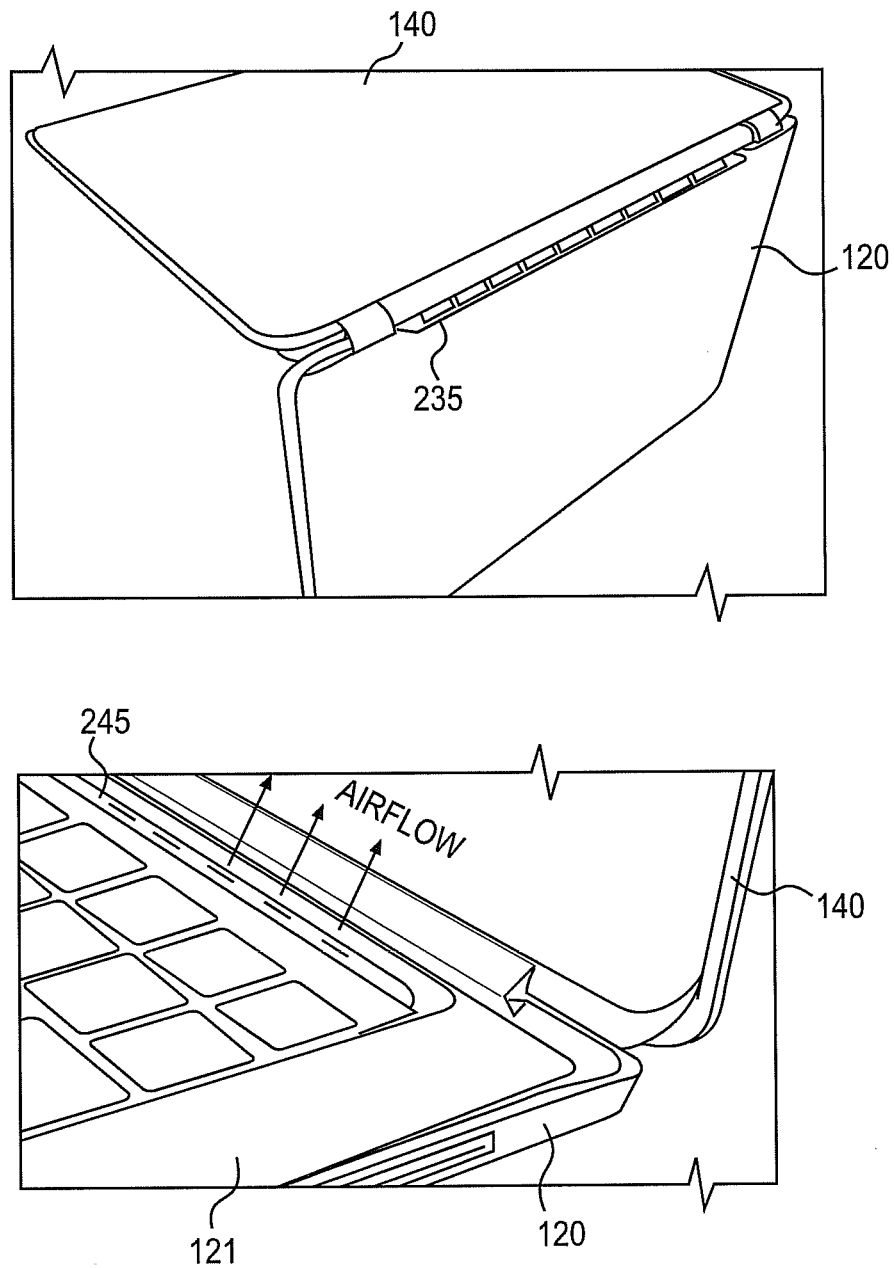
FIG. 10 shows a passively cooled computer according to an example embodiment.
Figure 11:
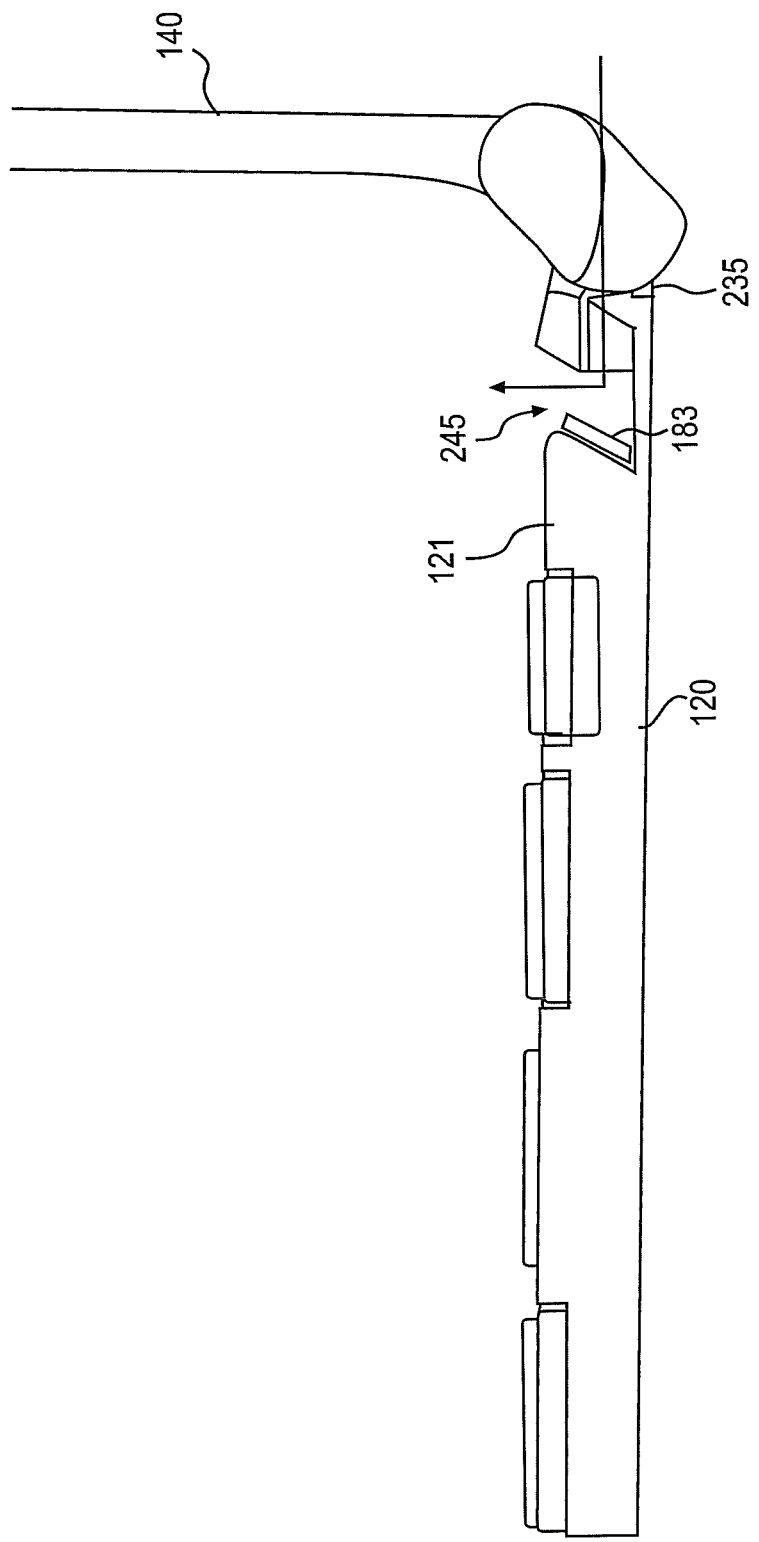
FIG. 11 is a cross-section view of a passively cooled computer of FIG. 10.

FIG. 10 shows a passively cooled computer according to an example embodiment. FIG. 11 is a cross-sectional view of the passively cooled computer of FIG. 10. Other embodiments and configurations may also be provided.

More specifically, FIGS. 10-11 show an opening 235 at a rear side (or back side) of the base 120. The opening 235 may include vents (or slits) to allow an air flow to pass through the opening 235 and be provided at the top surface 121 of the base 120. The air flow may exit the base 120 through an opening 245 at the top surface 121 of the base 120. A heat exchanger and/or a heat exchange surface may be provided in the base between the opening 235 and the opening 245.

The thermal design of FIG. 11 may generally correspond to the thermal design of FIG. 4. In the FIG. 11 embodiment, an opening may be provided at a rear side (or back side) of the base 120. The heat exchanger 183 may be present at the rear facing surface below the opening 245. One surface of the heat exchanger 183 may be exposed to outside of the base 120.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a base having a top side and a bottom side, the bottom side including a first bottom part and a second bottom part to extend in a different direction than the first bottom part;
   a lid having a display;
   a hinge device to allow the lid to move relative to the base between a closed state and an opened state, the hinge device to include a first hinge device and a second hinge device; and
   a bar-shaped heat exchanger provided at an area of the base, the bar-shaped heat exchanger made of a metallic material, the bar-shaped heat exchanger to extend in a longitudinal direction between the first hinge device and the second hinge device, the bar-shaped heat exchanger having a first heat exchange surface exposed to outside the base at the top side of the base and a second heat exchange surface exposed to outside the base at the second bottom part of the base.

2. The electronic device of claim 1, wherein the first heat exchange surface of the heat exchanger provided at a tapered section of the top side of the base, wherein the tapered section to slope at an angle from the top side of the base to the second bottom part of the base.

3. The electronic device of claim 1, wherein the base has a venting slit on the top side of the base, and the first heat exchange surface of the heat exchanger is exposed to outside the base via the venting slit.

4. The electronic device of claim 1, wherein the heat exchanger is at a back end of the base.

5. The electronic device of claim 1, wherein the base includes a processor and a heat dissipating device coupled to the processor, the heat exchanger to receive heat from the heat dissipating device.

6. The electronic device of claim 1, wherein the first heat exchange surface of the heat exchanger is at a top surface of the base.

7. The electronic device of claim 1, wherein the first heat exchange surface of the heat exchanger is exposed to outside of the base at a top surface of the base.

8. The electronic device of claim 1, wherein the bar-shaped heat exchanger is exposed to outside of the base at the second bottom part of the base.

9. An electronic device comprising:
a base to support a processor and a keyboard, the base including a top surface, a first bottom surface and a second bottom surface, and the second bottom surface to be inclined with respect to the first bottom surface;
a lid to support a display;
a hinge device coupled to the lid and the base, the hinge device to include a first hinge device and a second hinge device; and
a metallic bar-shaped heat exchanger exposed to an exterior of the base at an area between the first hinge device and the second hinge device, the metallic bar-shaped heat exchanger includes a first surface exposed to an exterior of the base to remove a portion of the heat received at the metallic bar-shaped heat exchanger, the first surface of the heat exchanger is exposed to outside of the electronic device at the top surface of the base, and the keyboard is at the top surface of the base.

10. The electronic device of claim 9, wherein the first surface of the metallic heat exchanger is exposed to an exterior of the base at a tapered section of the base, the tapered section to slope at an angle from the top surface of the base to the second bottom surface of the base.

11. The electronic device of claim 9, wherein the metallic heat exchanger includes a second surface exposed to an exterior of the base.

12. The electronic device of claim 9, wherein the base includes a venting slit, and the metallic heat exchanger is exposed to an exterior of the base via the venting slit.

13. The electronic device of claim 9, wherein the base includes a heat dissipating device coupled to the processor, the metallic heat exchanger to receive heat from the heat dissipating device.

14. The electronic device of claim 9, wherein a second surface of the heat exchanger is exposed to outside of the electronic device at the second bottom surface of the base.

15. The electronic device of claim 9, wherein the heat exchanger is exposed to outside of the base at the second bottom surface of the base.

16. An electronic device comprising:
a base to support a processor and a keyboard, the base having a top side and a bottom side, the bottom side including a first part and a second part to extend in an inclined direction from the first part of the bottom side;
a lid to support a display;
a hinge device coupled to the lid and the base, the hinge device to include a first hinge device and a second hinge device; and
a metallic heat exchanger at a rear area of the base and exposed to an exterior of the base, the metallic heat exchanger having a bar-shape that extends in a direction between the first hinge device and the second hinge device, the metallic heat exchanger to remove a portion of the heat from the base, and the heat exchanger is exposed to an exterior of the base at a tapered section of the base, the tapered section of the base to slope at an angle from the top side of the base to the second part of the bottom side of the base.

17. The electronic device of claim 16, wherein the base includes a venting slit, and the metallic heat exchanger is exposed to an exterior of the base via the venting slit.

18. The electronic device of claim 16, wherein the base includes a heat dissipating device coupled to the processor, the metallic heat exchanger to receive heat from the heat dissipating device.

19. The electronic device of claim 7, further comprising a keyboard at the top surface of the base.

* * * * *